(12) United States Patent
Orlassino

(10) Patent No.: US 8,989,802 B2
(45) Date of Patent: Mar. 24, 2015

(54) METHODS AND APPARATUS FOR A MOBILE UNIT WITH DEVICE VIRTUALIZATION

(75) Inventor: Mark Orlassino, Centereach, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 717 days.

(21) Appl. No.: 12/360,257

(22) Filed: Jan. 27, 2009

(65) Prior Publication Data

US 2010/0190522 A1    Jul. 29, 2010

(51) Int. Cl.
*H04M 1/00* (2006.01)
*G06F 9/455* (2006.01)

(52) U.S. Cl.
CPC ..................................... *G06F 9/455* (2013.01)
USPC .................... 455/552.1; 455/426.1; 713/167; 713/185

(58) Field of Classification Search
CPC . G06F 21/53; G06F 3/04886; H04M 1/72522
USPC ......... 455/418–420, 550.1, 552.1, 432.1–433
See application file for complete search history.

(56) References Cited

U.S. PATENT DOCUMENTS

| | | | |
|---|---|---|---|
| 2005/0222918 | A1 | 10/2005 | Vanska et al. |
| 2007/0283147 | A1* | 12/2007 | Fried et al. ..................... 713/167 |
| 2007/0297373 | A1* | 12/2007 | Saifullah et al. .............. 370/338 |
| 2008/0122796 | A1* | 5/2008 | Jobs et al. ...................... 345/173 |
| 2008/0205339 | A1 | 8/2008 | Brophy |
| 2008/0248834 | A1* | 10/2008 | Chatterjee et al. ............ 455/557 |
| 2009/0015654 | A1 | 1/2009 | Hayashi |
| 2009/0235324 | A1* | 9/2009 | Griffin et al. ...................... 726/1 |
| 2009/0322890 | A1* | 12/2009 | Bocking et al. ............. 348/211.2 |
| 2012/0222114 | A1* | 8/2012 | Shanbhogue ................... 726/22 |

FOREIGN PATENT DOCUMENTS

| | | |
|---|---|---|
| CN | 1060545 A | 4/1992 |
| CN | 1878198 A | 12/2006 |
| EP | 0441509 A2 | 8/1991 |
| EP | 1670191 | 6/2006 |
| WO | 2004040923 | 5/2004 |
| WO | 2005117479 | 12/2005 |
| WO | 2008030976 | 3/2008 |

OTHER PUBLICATIONS

International Search Report and Written Opinion mailed Jul. 13, 2010 of International Application No. PCT/US10/021703, a foreign counterpart.

(Continued)

Primary Examiner — Chuong A Ngo

(57) ABSTRACT

A multi-context mobile unit includes a processor, a user interface coupled to the processor and configured to accept user input, a storage component coupled to the processor, and an input/output module coupled to the processor and configured to interact with at least one external network, wherein the processor is configured to selectively execute a plurality of virtual devices stored within the storage component in response to the user input, and wherein the plurality of virtual devices includes a first virtual device and a second virtual device having separate and isolated data access.

14 Claims, 3 Drawing Sheets

(56) References Cited

OTHER PUBLICATIONS

International Preliminary Report on Patentability and Written Opinion for International Patent Application No. PCT/US2010/021703 mailed on Aug. 11, 2011.
Office Action mailed on Oct. 25, 2011 in Candian Patent Application No. 2750571.
Office Action mailed on Feb. 7, 2012 in European Patent Application No. 10701428.4-2211.
Office Action mailed May 29, 2013 in Korean Patent Application No. 10-2011-7019907.
Office Action mailed May 28, 2013 in Chinese Patent application No. 201080005771.X.
Office Action dated Dec. 30, 2013 in counterpart Canada Patent Application 2,750,571.
Final Rejection dated Jul. 29, 2014 in counterpart Korea Patent Application 10-2011-7019907.
Notice of Preliminary Rejection dated Dec. 30, 2013 in counterpart Korea Patent Application 10-2011-7019907.

\* cited by examiner

METHODS AND APPARATUS FOR A MOBILE UNIT WITH DEVICE VIRTUALIZATION

TECHNICAL FIELD

The present invention generally relates to mobile units such as mobile computing devices, cellular phones, personal data assistants (PDAs), and the like, and more particularly relates to device virtualization in the context of such devices.

BACKGROUND

In recent years the use of cellular phones, smart phones, global positioning systems (GPS), personal data assistants (PDAs), laptop computers, and other such mobile units has increased dramatically. As a result, individuals have become more and more dependent upon such devices.

Unfortunately, it is rare for a single device to fulfill all the requirements a user may have during a typical day. Thus, an individual may carry around a PDA or cellular phone for work, another cellular phone for personal use, a laptop computer or portable game machine for entertainment, and so on. The need to carry around multiple devices is a significant inconvenience that will only increase as we become more and more dependent on portable devices and any networks associated therewith.

Accordingly, it is desirable to provide improved systems and methods for mobile devices that can be used in multiple contexts. Furthermore, other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The present invention generally relates to a multi-context mobile unit that incorporates a plurality of secure virtual devices. In this regard, the following detailed description is merely illustrative in nature and is not intended to limit the invention or the application and uses of the invention. Furthermore, there is no intention to be bound by any express or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., radio-frequency (RF) devices, memory elements, digital signal processing elements, logic elements, look-up tables, or the like, which may carry out a variety of functions under the control of one or more microprocessors or other control devices. In addition, those skilled in the art will appreciate that the present invention may be practiced in conjunction with any number of data transmission protocols and that the system described herein is merely one exemplary application for the invention.

For the sake of brevity, conventional techniques related to signal processing, data transmission, signaling, network control, the 802.11 family of specifications, wireless networks, cellular networks, and other functional aspects of the system (and the individual operating components of the system) may not be described in detail herein. Furthermore, the connecting lines shown in the various figures contained herein are intended to represent example functional relationships and/or physical couplings between the various elements. Many alternative or additional functional relationships or physical connections may be present in a practical embodiment.

Figure 1:
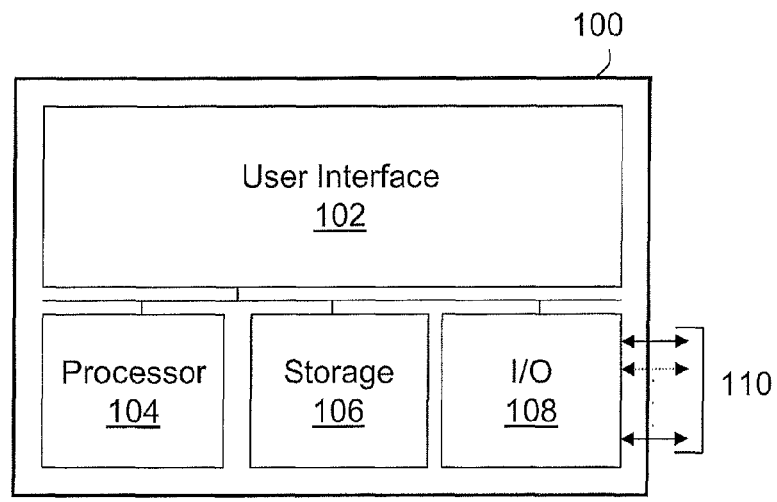
FIG. 1 is a conceptual overview of a mobile unit in accordance with an exemplary embodiment of the present invention.

Referring now to FIG. 1, a mobile unit 100 in accordance with one embodiment generally includes one or more processors (e.g., microprocessor or microcontroller) 104, one or more storage components (e.g., RAM, ROM, disk storage, etc.) 106, a user interface 102, and an I/O module 108, all suitably interconnected via a bus or other connection means.

Processor 104 is configured to carry out software and/or firmware instructions stored within storage 106, in the conventional manner, while interfacing with user interface 102 and I/O 108, as described in further detail below.

User interface 102 may include any combination of hardware and software components configured to provide an interface with a human user, including, but not limited to, touch screens (e.g., capacitive and resistive screens), keyboards, buttons, dials, displays (e.g., LCDs, LEDs, etc.), and the like.

I/O module 108 provides, among other things, wireless communication with any number of external devices and networks in accordance with the appropriate physical transmission types and protocols (110). In this regard, I/O 108 may be configured, for example, to communicate via WiFi (IEEE 802.11), IrDA (infrared), Bluetooth, ZigBee (and other variants of the IEEE 802.15 protocol), IEEE 802.16 (WiMAX or any other variation), Direct Sequence Spread Spectrum, Frequency Hopping Spread Spectrum, cellular/wireless/cordless telecommunication protocols (e.g., 3G), wireless home network communication protocols, paging network protocols, GPS, magnetic induction, satellite data communication protocols, wireless hospital or health care facility network protocols such as those operating in the WMTS bands, GPRS, and proprietary wireless data communication protocols such as variants of Wireless USB.

Mobile unit 100 may take a variety of forms and have any desired physical dimensions. For example, mobile unit 100 may be the size of a cellular phone, PDA, or the like, or may be the size of a conventional laptop or sub-notebook. Indeed, mobile unit 100 may in fact be a general purpose computer configured to provide the functionality detailed below.

Figure 2:
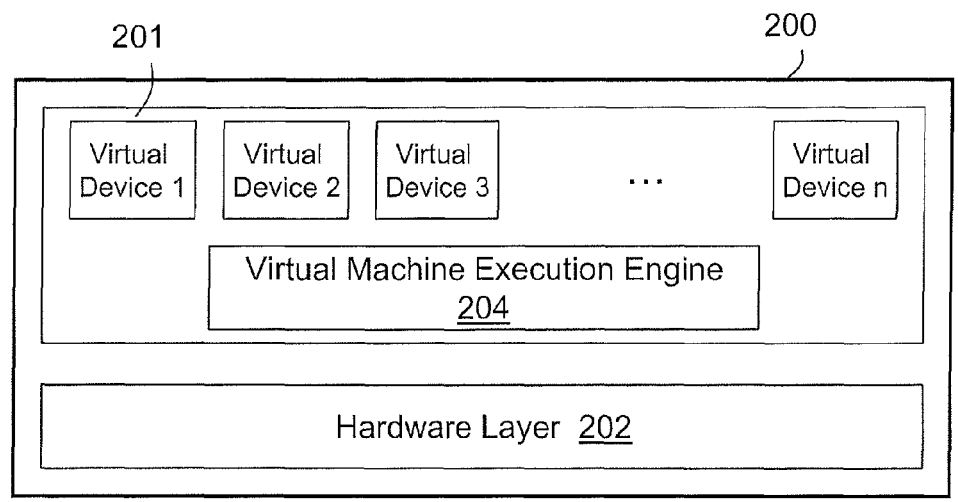
FIG. 2 is a conceptual high-level block diagram of an exemplary embodiment of the present invention.

In accordance with one aspect of the present invention, mobile unit 100 is configured to execute any number of virtual devices in a secure manner. More particularly, FIG. 2 shows a logical, high-level block diagram of a virtualization system 200 in accordance with one embodiment of the present invention, which is implemented via the various components of mobile unit 100 shown in FIG. 1.

Virtualization system 200 generally includes a virtual machine execution engine (or simply "engine") 204, a hardware layer 202, and a plurality of virtual devices 201. Engine 204 is configured to securely execute each of the virtual devices 201 such that they can be individually selected and operated (via user interface 102) by a user, all within a single mobile unit 100. Virtual devices 201, when selected and executed, can then interact with external networks via I/O 108. Hardware 202 refers to the physical hardware layer corresponding to the various components of mobile unit 100 that implement the virtual devices 201 (e.g., I/O 108, processor 104, user interface 102, etc.).

Each of the virtual devices 201 may emulate any type of component, software program, or device, including, without limitation, a cellular telephone, a personal data assistant, a remote control device, a web browser, an instant messaging application, a digital camera, a video game platform, a multimedia player, a radio band tuner, a kiosk, an automotive key fob, automotive computer, a television monitor, or any other device now known or later developed.

Each virtual device 201 is preferably securely isolated such that, for example, they do not have access to each others data and storage. Each is preferably also independent as seen by the various wireless carriers associated therewith (e.g., separate billing, features, lock-down policies, carrier features, etc.)

In accordance with another aspect, forensic snapshots and/or back-ups of each virtual device 201 can be periodically stored to a backup archive or re-enabled. If a virtual device 201 is lost or damaged it can be restored using such a snapshot. Further, if a law enforcement agency requires review of the data associated with a particular virtual device 201, that agency can then execute the saved snapshot previously-captured in order to complete their review.

Virtual devices 201 are preferably portable such that they can be loaded onto other host emulators (e.g., hardware configurations other than mobile unit 100). For example, a virtual device 201 may be moved to a laptop computer, a set-top box, or the like. In this way, as new and faster hardware becomes available, the user may maintain his or her favorite virtual device settings.

In accordance with another aspect, the host emulator or mobile unit 100 is configured to favor performance of one virtual machine 201 over another virtual machine 201 based on, among other things, usage profiles. For example, during work hours, a virtual device 201 associated with a work phone may be given priority (with respect to clock speed, transmission rate, etc.) over a virtual device 201 associated with the user's personal phone.

Virtual devices 201 can be provisioned or activated based on the location of mobile unit 100. For example, retailers may provide a virtual phone to customers for their personal use while shopping within the site. As an incentive, shoppers may talk to friends for free as long as they continue to shop within the store, or they may be given phone time or WiFi credits based on their purchases in real time. This may be combined with affinity marketing—i.e., targeted ads are pushed to mobile unit 100 based on such purchases. In such a model, the retailer owns and controls uploading of the virtual phone, pays the carriers, and may disable the phone at any time. Similarly, employers may issue virtual phones that are active only during business hours.

Figure 3:
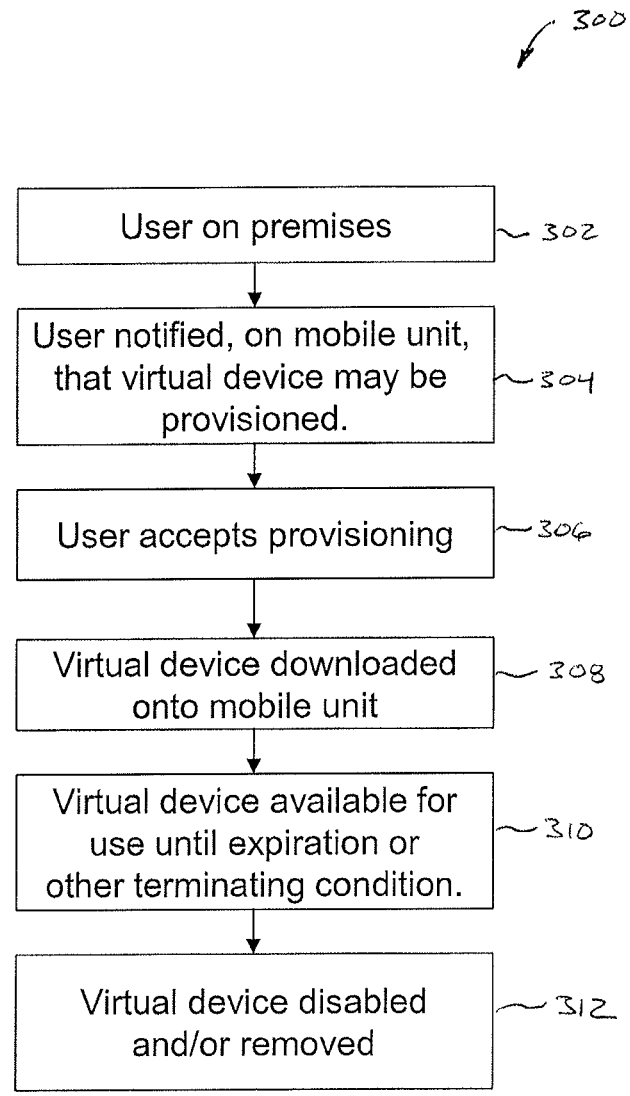
FIG. 3 is a flow chart of a method in accordance with embodiment.
Figure 4:
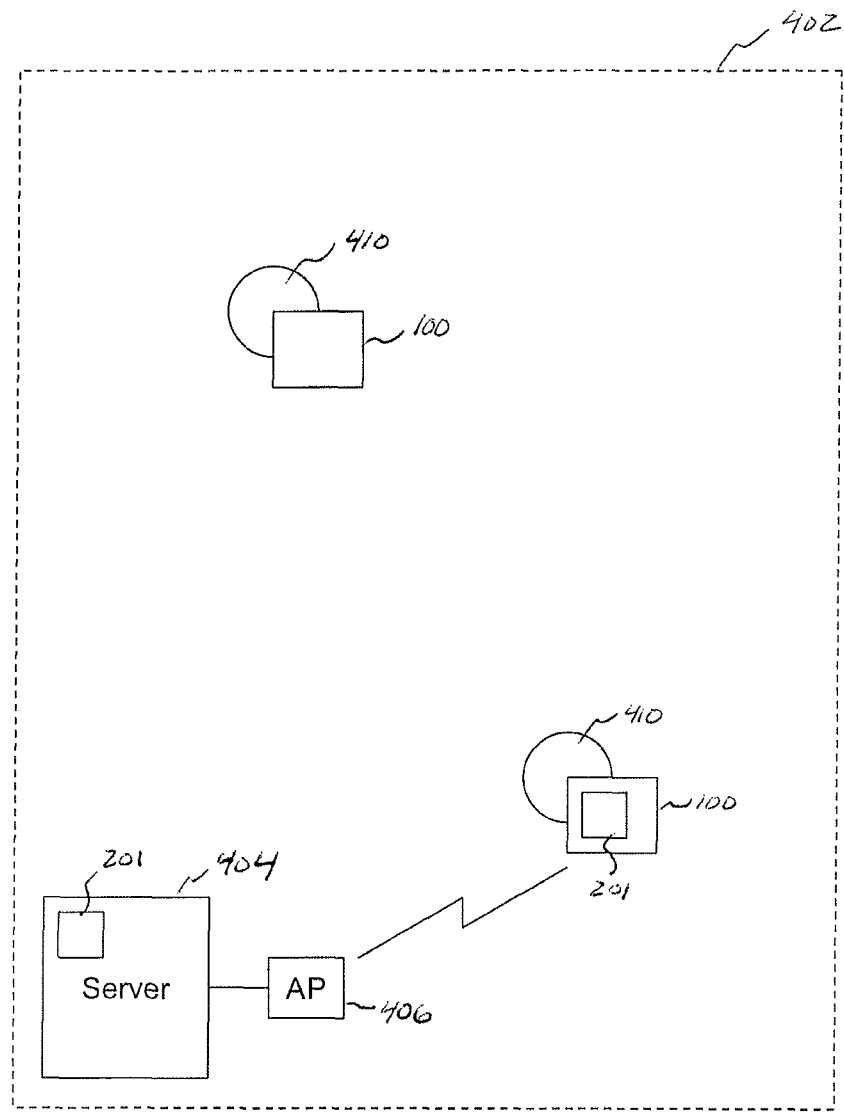
FIG. 4 illustrates an exemplary environment in which the present invention may be practiced

FIG. 3 depicts a provisioning method 300 in accordance with one example embodiment, and is referenced in conjunction with the environment illustrated in FIG. 4. As shown, one or more users 410 enters the premises 402 (step 302) (e.g., a retail site, a school, a business, etc.) with an associated mobile unit 100. Premises 402 may of course have any arbitrary shape and structure, and may be defined by a "virtual fence," i.e., a system of GPS, RFID, or other such components capable of providing locationing of items within the environment such as indoor location-based services.

After entering the premises 402, a user 410 is notified, on mobile unit 100, that a virtual device (such as a cell phone) is available for provisioning (step 304). In FIG. 4, such a virtual device 201 may be provided on a server 404 coupled to suitable network components, such as an access point 406 configured to wirelessly communicate with mobile unit 100 (e.g., via a 802.11 protocol). The user then may reject or accept the provisioning through any suitable user interface (step 306). When accepted, the virtual device 201 is downloaded and installed on mobile unit 100 (step 308). Additional authentication, identification, or other steps may be required, depending upon the context.

During the time that virtual device 201 is provisioned on mobile unit 100, it may be used for its intended purpose until the virtual device expires or experiences another terminating condition (step 310). At that time, the virtual device is disabled, removed, deleted, and/or de-installed from mobile unit 100 (step 312). The terminating event may, for example, relate to the mobile unit being removed from premises 402, the passing of a predetermined elapsed time of use, the manual removal of the virtual device from the mobile unit by the user, or the like. In one embodiment, in a retail context, the user may extend the use of the virtual device by purchasing certain items or through other aspects of affinity marketing.

Each virtual device 201 may be implemented using any suitable software code—e.g., a scripting language such as Python, Ruby, etc., a compiled language such as C, C++, C#, etc., or a platform independent bytecode-producing language such as Java, etc. Those skilled in the art will recognize that the functionality described herein may be implemented in a variety of ways, and is thus not limited to any particular software model.

It should be appreciated that the example embodiment or embodiments described herein are not intended to limit the scope, applicability, or configuration of the invention in any way. For example, these methods may be used in connection with standard barcode readers and the like. In general, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A mobile unit comprising:
   a virtual machine execution engine operating to:
   select a virtual device of a plurality of virtual devices based on at least one of a group of factors comprising a location, a usage profile, a time period, and a priority,
   securely execute the selected virtual device to provide independent operation, wherein the independent operation includes operation by a user via a user interface and an interface with an external communication network, and
   repeat the select and execute operations in response to a change in at least one of the factors; and
   the plurality of virtual devices, each of the plurality of virtual devices isolated from each other, when activated, operating to emulate a communication device independently associated with a wireless carrier managing the external communication network.

2. The mobile unit of claim 1, wherein the plurality of virtual devices emulating the communication device includes a device selected from a group consisting of a mobile cellular telephone device, remote control device, and a personal digital assistant.

3. The mobile unit of claim 1, wherein a state of each of the plurality of virtual devices is configured to be periodically stored, and wherein each of the states is subsequently restored.

4. The mobile unit of claim 1, wherein each of the plurality of virtual devices has separate access priorities.

5. The mobile unit of claim 1, wherein at least one of the plurality of virtual devices is automatically provided to the mobile unit when the mobile unit enters a particular environment, and is automatically removed or deactivated when the mobile unit exits the particular environment.

6. The mobile unit of claim 5, wherein the particular environment includes a particular geographic area or premises.

7. The mobile unit of claim 1, wherein the external communication network include wireless telecommunication protocols, WiFi, Bluetooth, Zigbee, wireless home network protocols, paging network protocols, GPS, satellite data communication protocols, and proprietary wireless data communication protocols.

8. A method of communicating via a mobile unit, the method comprising:

selecting a virtual device of a plurality of virtual devices within the mobile unit by a virtual machine execution engine based on at least one of a group of factors comprising a location, a usage profile, a time period, and a priority;

securely executing the selected virtual device by the virtual machine execution engine to provide independent operation, wherein the independent operation includes operation by a user via a user interface and an interface with an external communication network; and repeating the selection and execution operations by the virtual machine execution engine in response to a change in at least one of the factors, wherein the plurality of virtual devices, each of the plurality of virtual devices isolated from each other, when activated, operating to emulate a communication device independently associated with a wireless carrier managing the external communication network.

9. The method of claim 8, further the plurality of virtual devices, emulating the communication device, comprising a device selected from a group consisting of a mobile cellular telephone device, remote control device, and a personal digital assistant.

10. The method of claim 8, further comprising periodically storing a state of each of the plurality of virtual devices, and wherein each of the states is subsequently restored.

11. The method of claim 8, further comprising assigning separate access priorities for each of the plurality of virtual devices.

12. The method of claim 8, further comprising automatically providing at least one of the plurality of virtual devices to the mobile unit when the mobile unit enters a particular environment, and is automatically removed or deactivated when the mobile unit exits the particular environment.

13. The method of claim 12, wherein the particular environment includes a particular geographic area or premises.

14. The method of claim 8, wherein the external communication network include wireless telecommunication protocols, WiFi, Bluetooth, Zigbee, wireless home network protocols, paging network protocols, GPS, satellite data communication protocols, and proprietary wireless data communication protocols.

* * * * *